United States Patent [19]
Schmitt

[11] 3,958,601
[45] May 25, 1976

[54] SINGLE LEVER FAUCET VALVE CARTRIDGE

[75] Inventor: William C. Schmitt, Brown Deer, Wis.

[73] Assignee: Milwaukee Faucets, Inc., Milwaukee, Wis.

[22] Filed: July 18, 1975

[21] Appl. No.: 597,206

[52] U.S. Cl. .............................................. 137/636.2
[51] Int. Cl.² ........................................ F16K 11/02
[58] Field of Search.......... 137/625.17, 636.2, 636.3

[56] References Cited
UNITED STATES PATENTS

| | | | |
|---|---|---|---|
| 3,324,884 | 6/1967 | Dornaus.......................... | 137/625.17 |
| 3,543,799 | 12/1970 | Hayman...................... | 137/625.17 X |
| 3,736,959 | 6/1973 | Parkison........................ | 137/625.17 |

*Primary Examiner*—William R. Cline
*Attorney, Agent, or Firm*—James E. Nilles

[57] ABSTRACT

A single lever faucet valve cartridge for use within a faucet valve having hot and cold water inlets and for variably controlling the flow of water through these inlets. The valve cartridge includes a valve disc which is received in fluid tight sliding engagement over the inlets and which includes a pair of bores which can be aligned with the inlets by sliding movement of the disc to permit controlled flow of water from the inlets. The cartridge also includes a generally cylindrical cartridge body and a sealing member which are secured together in a snap fit relationship and which define a cylindrical chamber for rotatably supporting a cylindrical barrel. A lever is pivotably mounted intermediate its ends in a slot in the barrel so that it is journaled between the body member and the sealing member such that it has universal joint movement. One end of the lever protrudes from the sealing member for attachment to a faucet handle and the other end of the lever protrudes through a flat bottom wall of the cartridge body and is received in a bore in the valve disc in a snap fit relation. Movement of the lever will thus cause a sliding movement of the valve disc for alignment of the bores with the hot and cold water inlets.

8 Claims, 8 Drawing Figures

SINGLE LEVER FAUCET VALVE CARTRIDGE

BACKGROUND OF THE INVENTION

The present invention relates to single level faucet valves and to a control valve cartridge assembly used in such faucets to control the flow and mixture of hot and cold water through the valve. More specifically, the present invention is an improvement in prior art valve cartridges such as that described in U.S. Pat. No. 3,543,799 issued to Hayman, Dec. 1, 1970.

SUMMARY OF THE INVENTION

The object of the present invention is to set forth an improved valve cartridge for use in a single lever faucet which can accurately control the flow of water through the faucet, which can be readily manufactured, which is durable and which is free of maintenance.

The valve cartridge of the present invention is designed to be receivable within a water faucet having a cylindrical chamber for receiving the cartridge and having a flat bottom wall including hot and cold water inlets. The valve cartridge includes a valve disc which is slideably secured between a valve cartridge body and the flat bottom wall of the faucet chamber to selectively cover the hot and cold water inlets and thereby control the flow of water through the faucet. The valve disc includes a pair of bores therethrough which can be selectively aligned with the inlets in such a manner that the volume of water flowing through the respective hot and cold water inlets can be proportionately varied or completely shut-off. The valve cartridge further includes a cartridge body and a sealing member which may be secured together in a snap-fit relation and which define a generally cylindrical chamber for rotatably supporting a cylindrical barrel therein. A lever is pivotably journaled in said barrel such that it has universal joint movement. One end of the lever protrudes through a triangularly shaped bore in the sealing member for attachment to a faucet handle and the other end of the lever protrudes through a bore in the flat bottom wall in the cartridge body and is pivotally received in a bore in the upper portion of the valve disc. Movement of the lever attached to the faucet handle results in sliding movement of the valve disc such that it is aligned with the hot and cold water inlets.

The use of the rotatable cylindrical barrel of the present invention as a means of supporting the lever is a substantial improvement over the prior art and particularly that shown by the Hayman patent previously cited which employed the use of a lever journaled within a rotatable sphere. A particular advantage of valve cartridge of the invention over the prior art arises because manufacture of the molded plastic cylinder is substantially less complicated than molding a sphere around a lever where it is relatively difficult to maintain tolerances in every dimension.

The present invention contains further improvements over the prior art in that the cylindrical barrel is provided with a plurality of depressions for receiving the lubricating material and because the cylindrical chamber surrounding the cylindrical barrel forms fluid tight pockets with the depressions to provide a sealed lubrication means which will last the life time of the valve cartridge. This prolongs the useful life of the valve cartridge and avoids any necessity of maintenance of the cartridge. Furthermore, the valve cartridge body and of the sealing member include a complementary lug and groove fit which prevents the possibility of mistakes during assembly. These members also include mutually interlocking ramped shaped projections and complementary slots which permit a locked mating engagement of these parts when they are assembled and prevent any subsequent tampering with the cartridge.

Further objects and advantages of the invention will become apparent from the following detailed descriptions of the preferred embodiment of the invention.

DESCRIPTION OF THE PREFERRED EMBODIMENT

Figure 1:
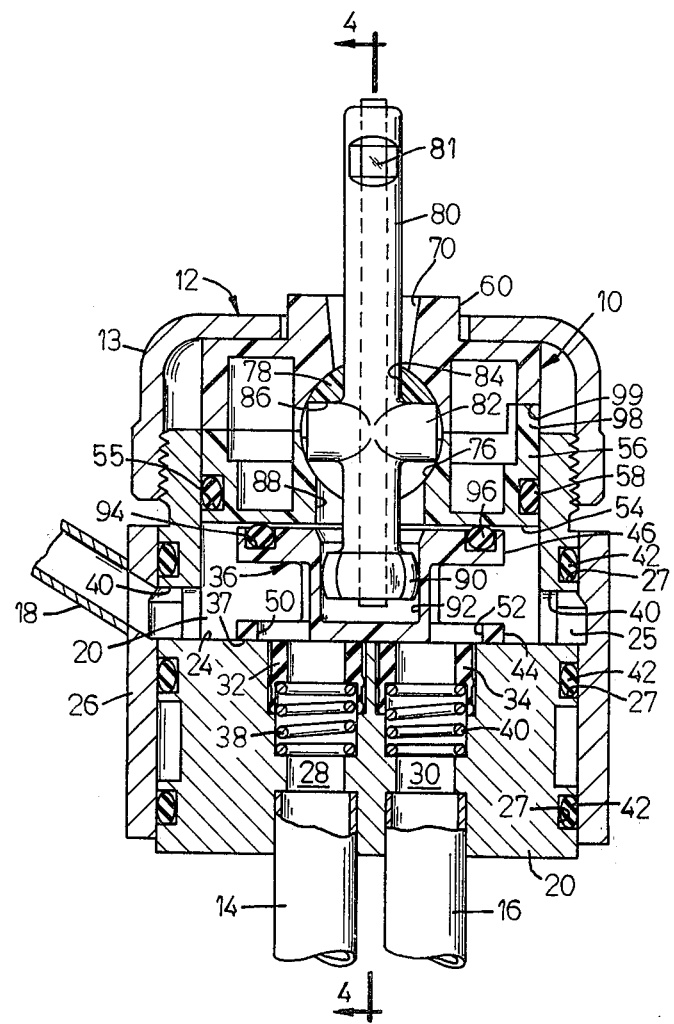
FIG. 1 is a vertical cross-sectional view through a valve embodying the single lever valve cartridge of the present invention.
Figure 4:
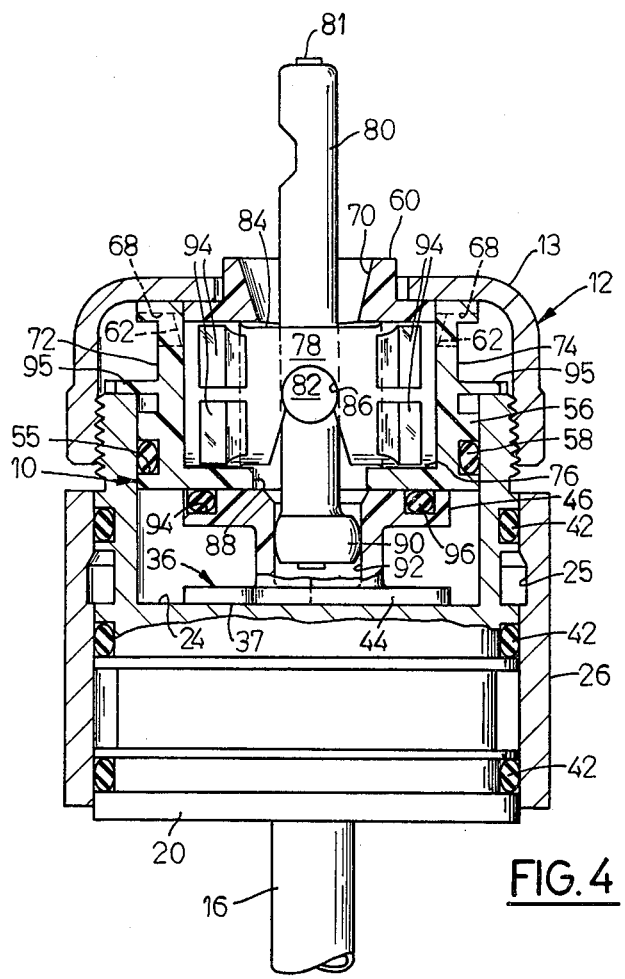
FIG. 4 is a cross-sectional view taken along the line 4—4 in FIG. 1.
Figure 5:
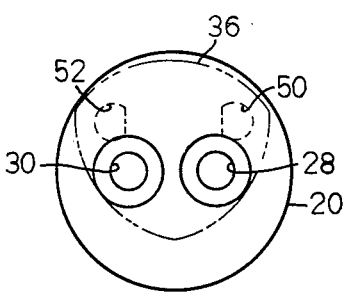
FIGS. 5–8 are diagrammatic views showing the relative positions of parts of the valve cartridge at different settings.
Figure 7:
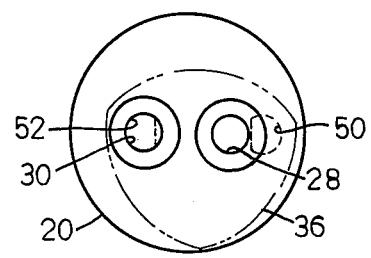
Figure 6:
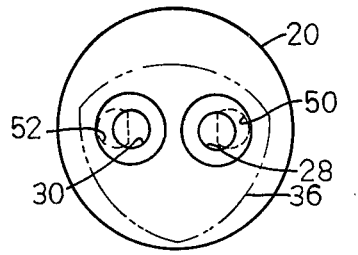
Figure 8:
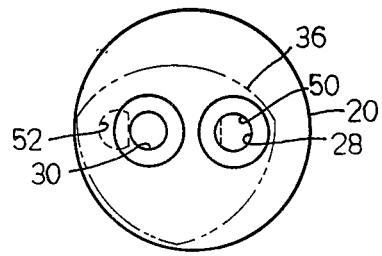

As shown in FIGS. 1 and 4, the faucet valve cartridge 10 of the invention is designated to be used in a faucet 12 to regulate the flow of water issuing from hot and cold water pipes 14 and 16 and flowing through a spout 18. The faucet 12 generally comprises a cylindrical housing 20 defining a central cylindrical chamber 22 having a flat bottom wall 24. The housing 20 is surrounded by a rotatable sleeve 26 which supports a spout 18 in such a manner that the spout 18 is rotatable around the housing (so that water may be directed through the spout 18 into either of two sinks as is generally desired). The housing 20 includes a pair of counter-sunk bores 28 and 30 comprising hot and cold water inlets and opening into the chamber 22. The bores 28 and 30 are connected at one end to the hot and cold water pipes 14 and 16 respectively and house resilient annular seals 32 and 34 at their other end. The annular seals 32 and 34 provide a fluid tight seal with the bottom surface 37 of a valve disc 36 in a manner which will be described hereafter. In order to insure this seal, seals 32 and 34 are biased into engagement with the bottom surface 37 of the valve disc 36 by coil springs 38 and 40 respectively. The faucet 12 also includes a threaded cap 13 receivable over the end of the chamber 22 and securing the cartridge 10 therein and forcing the valve disc 36 downwardly against the flat bottom wall 24.

The chamber 22 which receives water flowing through inlets 28 and 30, communicates with an annular chamber 25 in the sleeve 26 by means of bores 40 such that water flowing into the chamber 22 may flow into the spout 18. In order to provide fluid tight seals between the sleeve 26 and the housing 20 a plurality of O-rings 42 are provided within annular grooves 27 on the the outside surface of the housing 20.

Each of the component parts of the valve cartridge 10, to be described hereafter, can be formed from any of a variety of suitable materials but it has been found to be particularly advantageous to use low friction plastic materials having the characteristics of being relatively hard and resistant to heat. It is also advantageous to form those parts which have mutual rubbing contact with each other from different materials to avoid galling of these surfaces.

Figure 2:
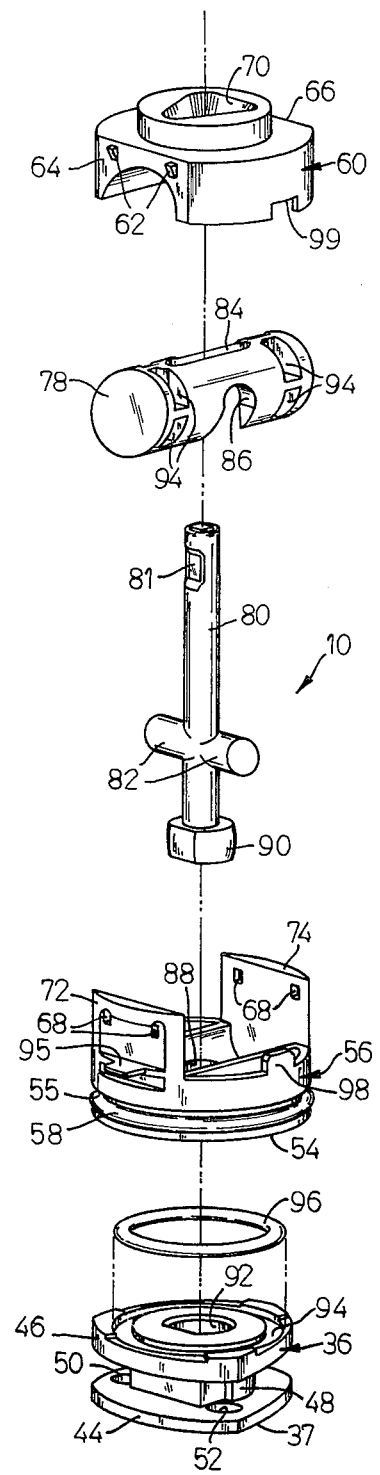
FIG. 2 is an exploded view of the single lever valve cartridge of the invention.
Figure 3:
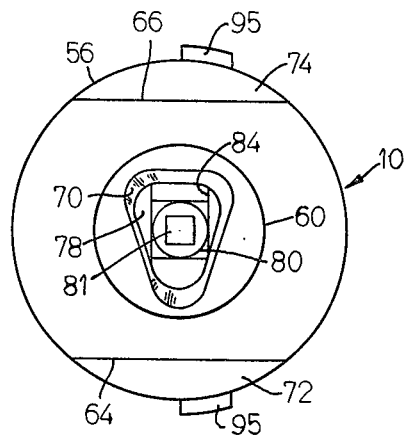
FIG. 3 is a top plan view of the valve cartridge of the invention.

As previously stated, the valve cartridge 10 includes a slideable valve disc 36 which has a flat bottom surface 37 received in flush engagement with the bottom wall 24 of the chamber 22 and which is received over the inlets 14 and 16 to control the flow of water into the chamber 22. As best shown in FIG. 2, the valve disc includes a bottom flange 44 and an upper flange 46 which are generally triangularly shaped with concave sides and which are connected by a stem 48. The bottom flange 44 includes a pair of shaped bores 50 and 52 therein which can be aligned upon sliding movement of the valve disc 36 with the inlets 28 and 30 so as to permit the flow of water through either or both of the inlets into the cylindrical chamber 22. As shown by FIGS. 5 through 8 variation of relative positions of the valve disc 36 and the bores 50 and 52 permits controlled variation of the size of openings through which the water may flow, which in turn facilitates regulation of the flow of hot and cold water.

The valve disc 36 is slideably secured between the flat bottom wall 24 of the chamber 22 and the flat lower surface 54 of a cartridge body 56. The cartridge body 56 is generally cylindrical and is received in fluid tight relationship within the cylindrical chamber 22. The cartridge body 56 is generally cylindrical and includes a pair of upwardly extending side wall projections 72 and 74 for receiving a sealing member 60 therebetween as will be described. A pair of flanges 95 are provided which extend radially outwardly from the cylindrical body 56 for receipt in slots in the housing 20 to prevent rotation of the valve cartridge 10 within the housing 20. The body 56 also includes an annular groove 55 around it lower portion for receiving a resilient O-ring 58 therein to insure a fluid tight seal between the walls of the housing 20 and the cylindrical body 56 thereby preventing leakage of water from the chamber 22 around the body 56.

The valve cartridge 10 also includes a sealing member 60 being generally circular but having opposed flat sides 64 and 66 to be received between the upwardly extending side walls 72 and 74 of the body 56. The sealing member 60 is secured to the cylindrical body 56 in a snap-fit relation by a plurality of wedged shaped projections 62 which extend outwardly from the flat sides 64 and 66 of the sealing member and which are engageable with slots 68 in the upwardly extending side walls 72 and 74 of the body 56. The body 56 and the sealing member 60, when held together in this snap-fit relation, define a cylindrical chamber 76 therebetween which has an axis extending parallel to the flat lower surface 54 of the cylindrical body 56 and which is designed to receive a rotatable cylindrical barrel 78 therein.

The cylindrical barrel 78 pivotably received in the chamber 76 includes a vertical slot 84 extending through its diameter generally intermediate its length for supporting a lever member 80 in pivotable relation. The lever member 80 includes a pair of projections 82 generally intermediate its length which extend perpendicular to its axis and which are received in sockets 86 in the cylindrical barrel in a snap-fit relation such that the lever 80 is pivotably mounted in the barrel. Since the cylindrical barrel 78 pivotably supporting the lever member 80 is rotatably received in the cylindrical chamber 76, the lever will be permitted universal joint movement. When the barrel 78 and the lever 80 are received in the cylindrical chamber 76, the upper end of the lever 80 projects upwardly through a triangularly shaped central bore 70 in the sealing member 60 such that it can be secured to a faucet lever (not shown). In order to rigidify the lever 80, and to facilitate its connection to a faucet lever, the lever includes a metal core 81. The lower end of the lever 80 projects downwardly from the bottom of the cylindrical barrel 78 and through a central bore 88 in the cylindrical body 56. The lower end of the lever includes a D-shaped enlargement 80 at its end which is receivable in a complementary bore 92 in the upper surface of the valve disc in a snap-fit relationship.

When the lever 80 is pivotably mounted within the rotating barrel as recited, movement of a faucet lever and the upper end of the lever 80 may result in pivotal movement of the lever 80 with respect to the cylindrical barrel 78 as well as rotation of the cylindrical barrel within the cylindrical chamber 76 thereby causing a consequent sliding action of the valve disc 36 between the bottom wall 54 of the cartridge body 56 and the wall 24 of the chamber 22 such that the bores 50 and 52 can be aligned with the inlets 28 and 30.

In order to enhance the useful life of the valve cartridge, the cylindrical barrel 78 is provided with a plurality of depressions 94 therein for receiving lubricating material such as grease. The cylindrical chamber 76 formed around the cylindrical barrel 78 by the body 56 and the sealing member 60 forms a plurality of fluid tight chambers with the depressions 94 thereby preventing effusion of the lubricating material and avoiding the necessity of any subsequent lubrication of the valve cartridge 10 following the manufacturing process.

The upper flange 46 of the valve disc includes a circular groove 94 for receiving a resilient O-ring 96 therein. This O-ring provides a seal between the valve disc 36 and the flat bottom wall 54 of the cylindrical body to prevent seepage of water from the chamber 22 into the central bore 88 in the bottom wall of the cylindrical body 56.

The triangularly shaped bore 70 in the upper wall of the sealing member has the function of limiting the extent of movement and the position of the upper end of the lever 80 to a specific number of positions. This in turn limits the possible sliding movement of the valve disc 36 to those positions shown in FIGS. 5–8.

It should be noted that the shape of the wedged shaped projections 62 permits the sealing member 60 to be forced downwardly into engagement with the cartridge body received in the slots 68 to secure the sealing member in locked mating engagement with the cylindrical body but prevents disassembly of the parts once the cartridge has been assembled during the manufacturing process. It should also be noted that the cartridge body 56 includes a lug 98 extending upwardly for receiving a complementary notch 99 in the sealing member 60 and thereby preventing inadvertent backward assembly of the sealing member and the cartridge body.

RESUME

The present invention thus presents an improved single lever valve cartridge which has the advantages of being less complicated to manufacture than the prior art valve cartridges and which includes means to prohibit unnecessary disassembly after the manufacturing process or inadvertent erroneous assembly thereby insuring the quality of the valve cartridge. Finally, the invention provides a valve cartridge having sealed lubrication means precluding the necessity of maintenance and prolonging the useful life of the valve cartridge.

I claim:

1. A single lever faucet valve cartridge for use with a faucet valve having a chamber for receiving the faucet valve cartridge and including fluid pressure inlets, said faucet valve cartridge comprising:
   a valve disc received in slideable fluid tight relationship over said inlets for variably blocking said inlets and including spaced bores for alignment with said inlets to permit fluid flow therethrough,
   a generally cylindrical cartridge body having a transverse generally flat wall for receiving said valve disc thereagainst in sliding relation,
   a sealing member engageable with an end of said body opposite said flat wall, said cartridge body and said sealing member defining a cylindrical chamber therebetween,
   a generally cylindrical barrel including a slot therethrough, and rotatably receivable in said cylindrical chamber such that the axis of said cylindrical barrel is parallel to said flat wall,
   and a lever pivotably received in and extending through said slot and journaled therein for universal joint movement with respect to said body and sealing member,
   said sealing member further including a bore extending therethrough, through which one end of said lever extends, and said lever being operably connected to said valve disc whereby movement of said one end of said lever causes sliding movement of said valve disc parallel to said flat wall and with respect to said inlets to permit variable alignment of said spaced bores with said inlets.

2. The faucet valve cartridge set forth in claim 1 wherein said cylindrical barrel includes depressions therein for receiving lubricating substance, and wherein said depressions and said cylindrical chamber form fluid tight chambers.

3. The faucet valve cartridge set forth in claim 1 wherein said cartridge body and said sealing member are secured together in locked mating engagement by mating projection and slot means.

4. The faucet valve cartridge set forth in claim 1 wherein said lever includes a pair of cylindrical projections intermediate its length and extending transversely to its axis, and wherein said cylindrical barrel includes socket means for receiving said projections in pivotable seated relationship.

5. A single lever faucet valve cartridge for use with a faucet valve having a chamber for receiving the faucet valve cartridge, said chamber including a flat bottom wall with fluid pressure inlets therein, said faucet valve cartridge comprising:
   a valve disc received in slideable fluid tight relationship with said flat bottom wall over said inlets for variably blocking said inlets and including bore means for alignment with said inlets to permit fluid flow therethrough,
   a generally cylindrical cartridge body having a transverse generally flat wall for receiving said valve disc thereagainst in sliding relation and including a central bore therethrough, said bore having an axis perpendicular to said flat wall,
   a sealing member received by an end of said body opposite said flat wall and in locked mating engagement, said cartridge body and said sealing member defining a cylindrical chamber therebetween,
   a generally cylindrical barrel rotatably receivable in said cylindrical chamber such that the axis of said cylindrical barrel is parallel to said flat wall and including a central slot therethrough, said central slot extending transversely to the axis of said cylindrical barrel,
   and a lever received in and extending through said central slot, said lever being pivotably connected to said cylindrical barrel whereby said lever is journaled for universal joint movement with respect to said body,
   said sealing member further including a bore extending therethrough, through which one end of said lever extends, and said valve disc including a bore for receiving an opposite end of said lever whereby movement of said one end of said lever causes sliding movement of said valve disc against said flat wall to permit variable alignment of said spaced bores with said inlets.

6. The faucet valve cartridge set forth in claim 5 wherein said cylindrical barrel includes depressions therein for receiving lubricating substance, and wherein said depressions and said cylindrical chamber form fluid tight chambers.

7. The faucet valve cartridge set forth in claim 5 wherein said cartridge body and said sealing member are secured together in locked mating engagement by mating projection and slot means.

8. The faucet valve cartridge set forth in claim 5 wherein said lever includes a pair of cylindrical projections intermediate its length and extending transversely to its axis, and wherein said cylindrical barrel includes socket means for receiving said projections pivotable seated relationship.

* * * * *